Oct. 13, 1953

G. J. SCOLES 2,655,597

LIMITING AMPLIFIER

Filed Jan. 30, 1948

Inventor:
Graham J. Scoles,
by Merton D. Moore
His Attorney.

Patented Oct. 13, 1953 2,655,597

UNITED STATES PATENT OFFICE 2,655,597

LIMITING AMPLIFIER

Graham J. Scoles, London, England, assignor to General Electric Company, a corporation of New York Application January 30, 1948, Serial No. 5,355
In Great Britain February 24, 1947

7 Claims. (Cl. 250—27)

My invention relates to a limiting amplifier and, more particularly, to a pulse shaping amplifier.

The term "limiting amplifier" implies an amplifier which derives an output signal only when the amplitude of the input signal exceeds a predetermined value or alternately is below a predetermined value. Such amplifiers hitherto have utilized diode electron discharge devices or the properties of cut-off of grid current in multi-electrode discharge devices.

It is an object of my invention to provide an improved limiting amplifier with sharp cut-off characteristics.

A further object of my invention, is to provide an improved limiting amplifier with suitable negative feed back to provide very sharp limiting action.

For additional objects and advantages and for a better understanding of my invention, attention is now directed to the following description and accompanying drawing and also to the appended claims in which the features of my invention believed to be novel are particularly pointed out.

I have shown, for purposes of illustration, limiting circuits comprising an electron discharge amplifying device arranged so as to give an output only when the amplitude of the input signal is above or alternately when it is below a predetermined value, characterized in that the discharge device has a cathode resistor across which the output is developed and has negative feed back between the anode and the grid.

Figure 1:
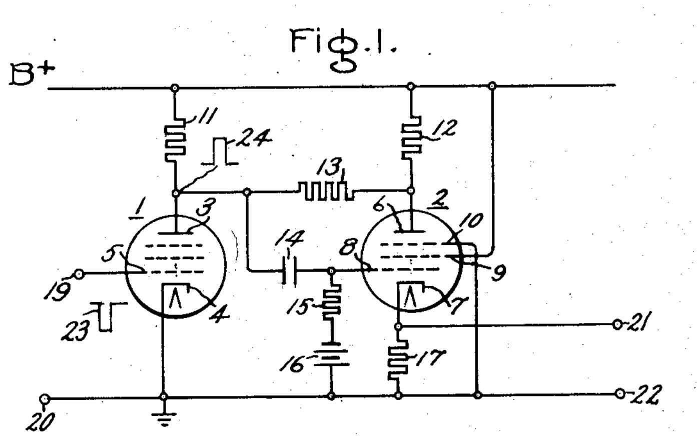
Fig. 1 is a circuit diagram illustrating one embodiment of the invention for obtaining cut-off below a certain limit.

Referring now to Fig. 1, I have shown a multistage amplifier having two pentode electron discharge devices such as might be used as a video amplifier in a television receiver. It comprises an amplifying device 1 feeding a device 2 which constitutes a cathode follower stage. The anode 3 of the device 1 is connected to a suitable B+ supply through a resistor 11, and the cathode 4 is connected to the grounded side of the input. The incoming signal is applied to the grid 5. The anode 6 of the device 2 is connected to a B+ supply through an anode resistor 12. The anodes 3 and 6 are tied together through a resistor 13 which serves as a negative feed back means interconnecting the two anodes. The grid 8 is normally biased beyond cut-off by a battery 16 through a grid resistance 15. A resistor 17 is connected to the cathode 7 and the output developed across this resistor is derived from the output terminal 21.

With the above arrangement, the battery 16 renders the device 2 normally non-conductive so that for a small value of input signal no output will appear in the output terminal 21. A negative pulse 23 is applied from the input terminal 19 to the control electrode 5 of the device 1. This produces a positive pulse 24 at the anode 3 of the device 1. The positive pulse 24 is applied to the control electrode 8 of the device 2 through a capacitor 4. When the positive pulse 24 is of sufficient positive amplitude at the grid 8 of the device 2 to render it conducting, an amplified signal, that is one having an amplification appreciably greater than unity, appears at the anode 6 of the device 2 and is fed back through the resistance 13 to the anode 3 of the device 1. This signal will appear in opposite polarity to the voltage developed at the anode 3 of the device 1 and will hence partially neutralize the input to the grid 8 to the device 2. This results in a very sharp limiting action.

It can be shown that when device 2 is conducting, the gain of the system is proportional to the resistance 11 in parallel with the resistance 13 divided by (M+1) where M is the amplification factor of the device 2. Thus, due to feed back, the amplification of device 1 is considerably reduced but to an extent proportional to the mutual conductance of the device 2. As the output 21 is also to a large extent proportional to this factor, it follows that the output of the circuit will be very nearly proportional to the input so long as the device 2 is conducting, and zero when it is not. In other words, the limiting action is very sharp, more so that if the negative feed back were omitted.

Figure 3:
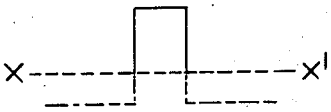
Figs. 3 and 4 are wave forms illustrating the effects obtained by the circuits of Figs. 1 and 2, respectively.

Referring now to Fig. 3, in which this action is illustrated, the line XX' indicates the cut-off point of the device 2 below which the input signals are suppressed in the output but above which the signals are passed through to the output.

Best results are obtained when the resistance 17 is of a value of the order of or smaller than the cathode impedance of the device 2. For example, where the resistance 17 was 70 ohms and a wide band required, the equivalent anode load of the device 1 was reduced from its original value of 8000 ohms to approximately 2000 ohms by the feed back.

Figure 2:
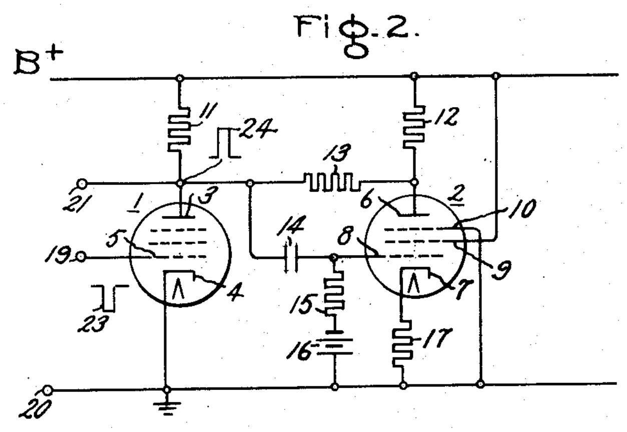
Fig. 2 is a circuit diagram showing an embodiment of the invention for obtaining cut-off above a certain limit.
Figure 4:
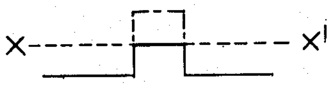

Referring now to Fig. 2, I have shown a circuit arrangement where it is desired to suppress negative going signals above a given level. The same reference numerals have been assigned to the corresponding components as in Fig. 1 and a detailed description will be omitted. As in Fig. 1, a negative pulse 23 is applied to the control electrode 5 of the device 1 producing a positive pulse 24 on the anode 3. The positive pulse 24 is applied to the control electrode 8 of the device 2. When the pulse 24 is of sufficient positive amplitude at the grid 8 of the device 2 to render it conducting, a negative pulse is fed back through the resistor 13 to the anode 3 of the device 1. Hence, it can be seen that the output at the anode of the device 1 is highly attenuated once the device 2 becomes conducting and the output 21 is taken from this point. In order to provide sufficient limiting, it may be desirable that the resistance 13 be tapped in order that perfect limiting will be obtained. Fig. 4 is an illustration of the wave form obtained by the limiting action of Fig. 2.

My invention is not limited to the precise circuit shown but is applicable to all feed back amplifiers in which one or more stages are entirely biased beyond cut-off. Also by the use of grid capacitors, the polarity may be inverted and said grid current utilized in place of the cut-off in order to produce the required limiting.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In combination, a pair of electron discharge amplifiers, each having a control electrode, an anode, and a cathode, a source of operating potential, the anodes of said amplifiers being connected to the positive terminal of said source through respective load resistors, and the cathodes of each of said amplifiers being connected to the negative terminal of said source, whereby current flows in each of said amplifiers to an extent dependent on the voltage between the control electrodes and cathode of the respective amplifiers, means to bias sufficiently the control electrode of one amplifier negatively with respect to the cathode thereof normally to prevent the flow of current in said amplifier, means to supply pulses between the control electrode and the cathode of the other amplifier of polarity to reduce current therein thereby to produce positive pulses on the anode thereof, means to supply said last positive pulses from said anode to the control electrode of said one amplifier to increase current therein to produce negative pulses on the anode of said one amplifier, and means to supply said negative pulses from the anode of said one amplifier to the control electrode thereof in opposition to the pulses supplied to said control electrode from the anode of said other amplifier.

2. In combination, a pair of electron discharge amplifiers, each having a control electrode, an anode, and a cathode, a source of operating potential, the anodes of said amplifiers being connected to the positive terminal of said source through respective load resistors, and the cathodes of each of said amplifiers being connected to the negative terminal of said source, whereby current flows in each of said amplifiers to an extent dependent on the voltage between the control electrodes and cathode of the respective amplifiers, means to bias sufficiently the control electrode of one amplifier negatively with respect to the cathode thereof normally to prevent the flow of current in said amplifier, means to supply pulses between the control electrode and the cathode of the other amplifier of polarity to reduce current therein thereby to produce positive pulses on the anode thereof, means to supply said last positive pulses from said anode to the control electrode of said one amplifier to increase current therein to produce negative pulses on the anode of said one amplifier, means to supply said negative pulses from the anode of said one amplifier to the control electrode thereof in opposition to the pulses supplied to said control electrode from the anode of said other amplifier, said last means comprising a resistance connected between said anodes.

3. In combination, a pair of electron discharge amplifiers, each having a control electrode, an anode, and a cathode, a source of operating potential, the anodes of said amplifiers being connected to the positive terminal of said source through respective load resistors, and the cathodes of each of said amplifiers being connected to the negative terminal of said source, whereby current flows in each of said amplifiers to an extent dependent on the voltage between the control electrodes and cathode of the respective amplifiers, means to bias sufficiently the control electrode of one amplifier negatively with respect to the cathode thereof normally to prevent the flow of current in said amplifier, means to supply pulses between the control electrode and the cathode of the other amplifier of polarity to reduce current therein thereby to produce positive pulses on the anode thereof, means to supply said last positive pulses from said anode to the control electrode of said one amplifier to increase current therein to produce negative pulses on the anode of said one amplifier, means to supply said negative pulses from the anode of said one amplifier to the control electrode thereof in opposition to the pulses supplied to said control electrode from the anode of said other amplifier, said last means comprising a resistance connected between said anodes, the parallel resistance of the load resistance of said second amplifier and of said last resistance divided by the amplification of the first amplifier plus 1 being proportional to the gain of said amplifiers.

4. In combination, a pair of electron discharge amplifiers, each having a control electrode, an anode, and a cathode, a source of operating potential, the anodes of said amplifiers being connected to the positive terminal of said source through respective load resistors, and the cathodes of each of said amplifiers being connected to the negative terminal of said source, whereby current flows in each of said amplifiers to an extent dependent on the voltage between the control electrodes and cathode of the respective amplifiers, means to bias the control electrode of one amplifier negatively with respect to the cathode thereof sufficiently normally to prevent the flow of current in said amplifier, means to supply pulses between the control electrode and the cathode of the other amplifier of polarity to reduce current therein thereby to produce positive pulses on the anode thereof, means to supply said last positive pulses from said anode to the control electrode of said one amplifier to increase current therein to produce negative pulses on the anode of said one amplifier, means to supply said negative pulses from the anode of said one amplifier to the control electrode thereof in opposition to the pulses supplied to said control electrode from the anode of said other amplifier, said last means comprising a resistance connected between said anodes, a resistance between the cathode of said one amplifier and the negative terminal of said source, and a load circuit connected across said last resistance whereby pulses are supplied to said load circuit only when the pulses applied to the control electrode of said other amplifier exceed a predetermined value.

5. In combination, a pair of electron discharge amplifiers, each having a control electrode, an anode, and a cathode, a source of operating potential, the anodes of said amplifiers being connected to the positive terminal of said source through respective load resistors, and the cathodes of each of said amplifiers being connected to the negative terminal of said source, whereby current flows in each of said amplifiers to an extent dependent on the voltage between the control electrodes and cathode of the respective amplifiers, means to bias sufficiently the control electrode of one amplifier negatively with respect to the cathode thereof normally to prevent the flow of current in said amplifier, means to supply pulses between the control electrode and the cathode of the other amplifier of polarity to reduce current therein thereby to produce positive pulses on the anode thereof, means to supply said last positive pulses from said anode to the control electrode of said one amplifier to increase current therein to produce negative pulses on the anode of said one amplifier, means to supply said negative pulses from the anode of said one amplifier to the control electrode thereof in opposition to the pulses supplied to said control electrode from the anode of said other amplifier, said last means comprising a resistance connected between said anodes, a load circuit connected between the anode and cathode of said other amplifier whereby pulses are supplied to said load circuit of magnitude determined by said resistance between said anodes.

6. In combination, a pair of electron discharge amplifiers, each having a control electrode, an anode, and a cathode, a source of operating potential, the anodes of said amplifiers being connected to the positive terminal of said source through respective load resistors, and the cathodes of each of said amplifiers being connected to the negative terminal of said source, whereby current flows in each of said amplifiers to an extent dependent on the voltage between the control electrodes and cathode of the respective amplifiers, means to bias sufficiently the control electrode of one amplifier negatively with respect to the cathode thereof normally to prevent the flow of current in said amplifier, means to supply pulses between the control electrode and the cathode of the other amplifier of polarity to reduce current therein thereby to produce positive pulses on the anode thereof, means to supply said last positive pulses from said anode to the control electrode of said one amplifier to increase current therein to produce negative pulses on the anode of said one amplifier, means to supply said negative pulses from the anode of said one amplifier to the control electrode thereof in opposition to the pulses supplied to said control electrode from the anode of said other amplifier, said last means comprising a resistance connected between said anodes, a load circuit connected between an intermediate point on said last resistance and the cathode of said other amplifier whereby pulses supplied to said load circuit are limited to a predetermined amplitude.

7. In combination an electron discharge amplifier having a control electrode, an anode, and a cathode, a source of operating potential, the anode of the amplifier being connected to the positive terminal of the source through a load resistance, and the cathode to the negative terminal of the source whereby current flows in the amplifier to an extent dependent on the voltage between the control electrode and cathode, means to bias sufficiently the control electrode negatively with respect to the cathode normally to prevent the flow of current in the amplifier, means to supply positive pulses between the control electrode and the cathode of the amplifier, and means to supply the negative pulses from the anode of the amplifier to the control electrode thereof in opposition to the pulses supplied to the control electrode.

GRAHAM J. SCOLES.

References Cited in the file of this patent

UNITED STATES PATENTS

| Number | Name | Date |
|---|---|---|
| 2,202,522 | Gloess | May 28, 1940 |
| 2,276,565 | Crosby | Mar. 17, 1942 |
| 2,410,081 | Kenyon | Oct. 29, 1946 |
| 2,428,149 | Falk | Sept. 30, 1947 |
| 2,429,775 | Seright | Oct. 28, 1947 |
| 2,458,849 | Grambsch | Jan. 11, 1949 |
| 2,495,511 | Dolberg | Jan. 24, 1950 |
| 2,541,811 | Crownover et al. | Feb. 13, 1951 |
| 2,548,532 | Hedeman, Jr. | Apr. 10, 1951 |

FOREIGN PATENTS

| Number | Country | Date |
|---|---|---|
| 270,817 | Great Britain | May 16, 1927 |